US012580644B2

(12) United States Patent
Tayyab et al.

(10) Patent No.:     US 12,580,644 B2
(45) Date of Patent:     Mar. 17, 2026

(54) MODE SWITCHING SCHEMES FOR A RECONFIGURABLE INTELLIGENT SURFACE ASSISTED BACKSCATTER COMMUNICATIONS

(71) Applicant: Nokia Technologies Oy, Espoo (FI)

(72) Inventors: Muhammad Tayyab, Oulu (FI); Nitin Mangalvedhe, Naperville, IL (US); Muhammad Majid Butt, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 6 days.

(21) Appl. No.: 18/804,779

(22) Filed: Aug. 14, 2024

(65) Prior Publication Data

US 2025/0088266 A1     Mar. 13, 2025

(30) Foreign Application Priority Data

Sep. 8, 2023   (FI) ..................................... 20236008

(51) Int. Cl.
| | |
|---|---|
| *H04B 7/22* | (2006.01) |
| *H04B 7/04* | (2017.01) |
| *H04W 28/02* | (2009.01) |

(52) U.S. Cl.
CPC ........... *H04B 7/22* (2013.01); *H04B 7/04013* (2023.05); *H04W 28/0215* (2013.01)

(58) Field of Classification Search
CPC .. H04B 7/22; H04B 7/04013; H04W 28/0215
USPC ....................................................... 375/262
See application file for complete search history.

(56) References Cited

U.S. PATENT DOCUMENTS

| | | | |
|---|---|---|---|
| 11,728,571 B2 | 8/2023 | Alkhateeb et al. | |
| 12,445,170 B2 * | 10/2025 | Jamadagni | ........... H04B 17/328 |

FOREIGN PATENT DOCUMENTS

| | | |
|---|---|---|
| CN | 114157333 A | 3/2022 |
| WO | 2022/133957 A1 | 6/2022 |
| WO | 2022/242603 A1 | 11/2022 |
| WO | 2022/249820 A1 | 12/2022 |
| WO | 2023/060460 A1 | 4/2023 |

OTHER PUBLICATIONS

Wu et al., "Towards Smart and Reconfigurable Environment: Intelligent Reflecting Surface Aided Wireless Network", IEEE Communications Magazine, vol. 58, No. 01, Jan. 2020, pp. 106-112.
Wu et al., "Intelligent Reflecting Surface-Aided Wireless Communications: A Tutorial", IEEE Transactions on Communications, vol. 69, No. 05, May 2021, pp. 3313-3351.

(Continued)

*Primary Examiner* — Dominic D Saltarelli
(74) *Attorney, Agent, or Firm* — McCarter & English LLP

(57)     ABSTRACT

Systems, methods, apparatuses, and computer program products for mode switching schemes for reconfigurable intelligent surface (RIS) assisted backscatter communications. The method may include connecting with a network node for communication, receiving, from the network node, an indication of activation of backscattering, receiving a backscatter signal together with a signal sent by the network node, and demodulating the backscatter signal and the signal sent by the network node, the backscatter signal including backscatter data.

20 Claims, 10 Drawing Sheets

(56)     References Cited

OTHER PUBLICATIONS

Cai et al., "Intelligent Reflecting Surface Assisted Multi-cell Multi-band Wireless Networks", IEEE Wireless Communications and Networking Conference (WCNC), Mar. 29-Apr. 1, 2021, 6 pages.
Kaur et al., "Artificial neural network based metasurface inspired planar frequency reconfigurable antenna for wireless applications", International Journal of RF and Microwave Computer-Aided Engineering, vol. 31, No. 09, 2021, pp. 1-13.
Wu et al., "Intelligent Reflecting Surface-Aided Wireless Energy and Information Transmission: An Overview", Proceedings of the IEEE, vol. 110, No. 01, Jan. 2022, pp. 150-170.
Zhao et al., "RIScatter: Unifying Backscatter Communication and Reconfigurable Intelligent Surface", arXiv, Jan. 16, 2023, pp. 1-15.
Office action received for corresponding Finnish Patent Application No. 20236008, dated Feb. 7, 2024, 12 pages.

\* cited by examiner

4000

S4010 — Reflecting communications between a network node and a user equipment

S4020 — Receiving an indication of activation of backscattering from the network node S4030 — Communicating with the network node and the device by receiving an incoming signal, modulating the received incoming signal with backscatter data and transmitting the modulated incoming signal

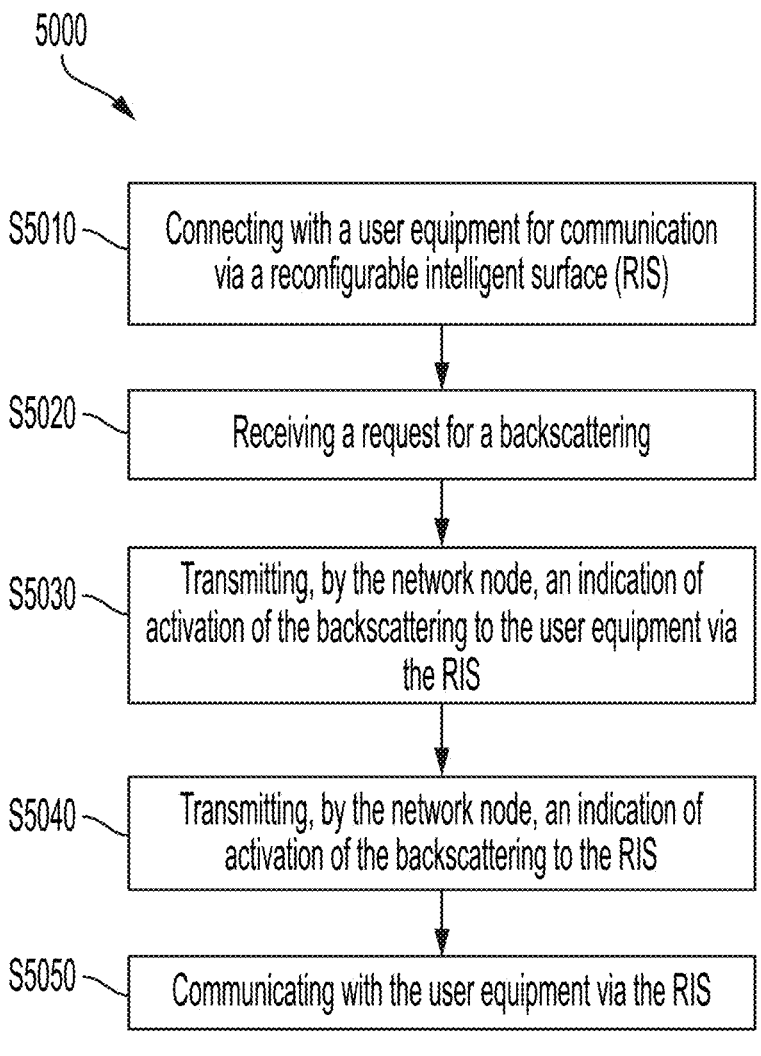

5000

S5010 — Connecting with a user equipment for communication via a reconfigurable intelligent surface (RIS)

S5020 — Receiving a request for a backscattering

S5030 — Transmitting, by the network node, an indication of activation of the backscattering to the user equipment via the RIS S5040 — Transmitting, by the network node, an indication of activation of the backscattering to the RIS S5050 — Communicating with the user equipment via the RIS

FIG. 5

MODE SWITCHING SCHEMES FOR A RECONFIGURABLE INTELLIGENT SURFACE ASSISTED BACKSCATTER COMMUNICATIONS

RELATED APPLICATION

This application claims priority to FI application Ser. No. 20/236,008 filed Sep. 8, 2023, which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for mode switching schemes for reconfigurable intelligent surface (RIS) assisted backscatter communications.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, fifth generation (5G) radio access technology or NR access technology, and/or 5G-Advanced. 5G wireless systems refer to the next generation (NG) of radio systems and network architecture. 5G network technology is mostly based on NR technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

An embodiment may be directed to an apparatus. The apparatus may include at least one processor and at least one memory storing instructions. The instructions stored in the at least memory, when executed by the at least one processor may cause the apparatus at least to perform connecting with a network node for communication, receiving, from the network node, an indication of activation of backscattering, receiving a backscatter signal together with a signal sent by the network node, and demodulating the backscatter signal and the signal sent by the network node, the backscatter signal including backscatter data.

An embodiment may be directed to an apparatus. The apparatus may include at least one processor and at least one memory storing instructions. The instructions stored in the at least memory, when executed by the at least one processor may cause the apparatus at least to perform reflecting communications between a network node and a user equipment, receiving an indication of activation of backscattering from the network node, and communicating with the network node and the user equipment by receiving an incoming signal, modulating the received incoming signal with backscatter data and transmitting the modulated incoming signal.

An embodiment may be directed to an apparatus. The apparatus may include at least one processor and at least one memory storing instructions. The instructions stored in the at least memory, when executed by the at least one processor may cause the apparatus at least to perform connecting with a user equipment for communication via a reconfigurable intelligent surface (RIS), receiving a request for a backscattering, transmitting, by a network node, an indication of activation of the backscattering to the user equipment via the RIS, transmitting, by the network node, an indication of activation of the backscattering to the RIS, and communicating with the user equipment via the RIS.

An embodiment may be directed to a method. The method can include connecting with a network node for communication, receiving, from the network node, an indication of activation of backscattering, receiving a backscatter signal together with a signal sent by the network node, and demodulating the backscatter signal and the signal sent by the network node, the backscatter signal including backscatter data.

An embodiment may be directed to a method. The method can include reflecting communications between a network node and a user equipment, receiving an indication of activation of backscattering from the network node, and communicating with the network node and the user equipment by receiving an incoming signal, modulating the received incoming signal with backscatter data and transmitting the modulated incoming signal.

An embodiment may be directed to a method. The method can include connecting with a user equipment for communication via a reconfigurable intelligent surface (RIS), receiving a request for a backscattering, transmitting, by a network node, an indication of activation of the backscattering to the user equipment via the RIS, transmitting, by the network node, an indication of activation of the backscattering to the RIS, and communicating with the user equipment via the RIS.

Another embodiment may be directed to an apparatus. The apparatus may include means for connecting with a network node for communication, means for receiving, from the network node, an indication of activation of backscattering, means for receiving a backscatter signal together with a signal sent by the network node, and means for demodulating the backscatter signal and the signal sent by the network node, the backscatter signal including backscatter data.

Another embodiment may be directed to an apparatus. The apparatus may include means for reflecting communications between a network node and a user equipment, means for receiving an indication of activation of backscattering from the network node, and means for communicating with the network node and the user equipment by receiving an incoming signal, modulating the received incoming signal with backscatter data and transmitting the modulated incoming signal.

Another embodiment may be directed to an apparatus. The apparatus may include means for connecting with a user equipment for communication via a reconfigurable intelligent surface (RIS), means for receiving a request for a backscattering, means for transmitting, by a network node, an indication of activation of the backscattering to the user equipment via the RIS, means for transmitting, by the network node, an indication of activation of the backscattering to the RIS, and means for communicating with the user equipment via the RIS.

Another embodiment may be directed to an apparatus comprising circuitry configured to perform a method. The method can include connecting with a network node for communication, receiving, from the network node, an indication of activation of backscattering, receiving a backscatter signal together with a signal sent by the network node, and demodulating the backscatter signal and the signal sent by the network node, the backscatter signal including backscatter data.

Another embodiment may be directed to an apparatus comprising circuitry configured to perform a method. The method can include reflecting communications between a network node and a user equipment, receiving an indication of activation of backscattering from the network node, and communicating with the network node and the user equipment by receiving an incoming signal, modulating the received incoming signal with backscatter data and transmitting the modulated incoming signal.

Another embodiment may be directed to an apparatus comprising circuitry configured to perform a method. The method can include connecting with a user equipment for communication via a reconfigurable intelligent surface (RIS), receiving a request for a backscattering, transmitting, by a network node, an indication of activation of the backscattering to the user equipment via the RIS, transmitting, by the network node, an indication of activation of the backscattering to the RIS, and communicating with the user equipment via the RIS.

Another embodiment may be directed to a non-transitory computer readable medium comprising program instructions stored thereon that, when executed by an apparatus, cause the apparatus to perform at least a method. The method can include connecting with a network node for communication, receiving, from the network node, an indication of activation of backscattering, receiving a backscatter signal together with a signal sent by the network node, and demodulating the backscatter signal and the signal sent by the network node, the backscatter signal including backscatter data.

Another embodiment may be directed to a non-transitory computer readable medium comprising program instructions stored thereon that, when executed by an apparatus, cause the apparatus to perform at least a method. The method can include reflecting communications between a network node and a user equipment, receiving an indication of activation of backscattering from the network node, and communicating with the network node and the user equipment by receiving an incoming signal, modulating the received incoming signal with backscatter data and transmitting the modulated incoming signal.

Another embodiment may be directed to a non-transitory computer readable medium comprising program instructions stored thereon that, when executed by an apparatus, cause the apparatus to perform at least a method. The method can include connecting with a user equipment for communication via a reconfigurable intelligent surface (RIS), receiving a request for a backscattering, transmitting, by a network node, an indication of activation of the backscattering to the user equipment via the RIS, transmitting, by the network node, an indication of activation of the backscattering to the RIS, and communicating with the user equipment via the RIS.

BRIEF DESCRIPTION OF THE DRAWINGS

For proper understanding of example embodiments, reference should be made to the accompanying drawings, wherein:

FIG. 5 illustrates an example flow chart for a method of controlling the network base station, according to certain example embodiments;

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for mode switching schemes for RIS assisted backscatter communications.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "base station", "cell", "node", "gNB", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Figure 1:
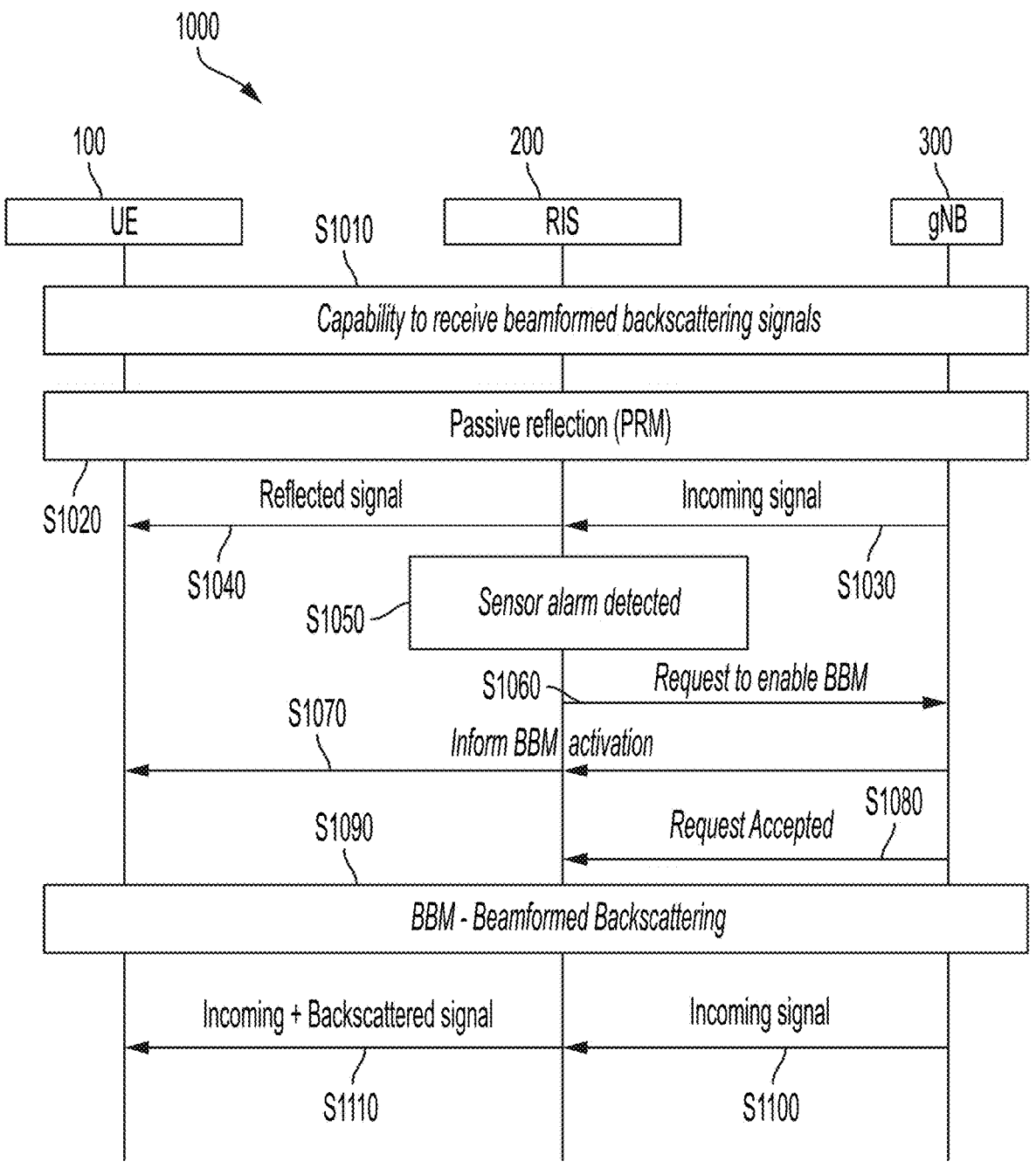
FIG. 1 illustrates an example signal diagram of communications between a user equipment (UE), a reconfigurable intelligent surface (RIS), and network base station (gNB), according to certain example embodiments.

FIG. 1 illustrates an example signal diagram 1000 of communications between a user equipment (UE) 100, a reconfigurable intelligent surface (RIS) 200, and network base station (gNB) 300, according to certain example embodiments. The UE 100 may be a device such as a computer, tablet, cell phone, etc. The RIS 200 may be a device which reflects and/or modulates signals to facilitate communications between the UE 100 and the gNB 300. The network base station 300 may be a base station, or other network element which communicates with devices. The network base station may be part of a network that includes other devices including servers, processors, computers, base stations, etc. which can communicate electronically. The UE 100, RIS 200, and gNB 300 may communicate electronically using wireless communications.

At S1010, the UE 100 may share its capability to receive beamformed backscatter signals with the gNB 300. The UE 100 may share this capability as part of a handshake process or initiation of an application or another similar type of communication between the UE 100 and gNB 300. The communications may be via the RIS 200. The RIS 200 may reflect communications between the UE 100 and the gNB 300. The RIS 200 may be configured to steer the communications to a location of the UE 100 and gNB 300 based on a configuration of active and passive elements in the RIS 200.

At S1020, the UE 100 and gNB 300 may communicate via the RIS 200 using passive reflection in a passive reflection mode. In the passive reflection mode the RIS 200 may reflect signals from the gNB 300 to the UE 100 and reflect signals from the UE 100 to the gNB 300. The active elements of the RIS may be configured to direct the signals and may not change configuration during the passive reflection mode.

At S1030, an incoming signal from the gNB 300 sent by the gNB 300 and arrives at the RIS 200. At S1040, the RIS 200 in the passive reflection mode reflects the incoming signal toward the UE 100 without any modulation of the incoming signal and the UE 100 receives the reflected signal.

At S1050, one or more of the active elements of the RIS 200 may sense an alarm condition via a sensor in (or connected to) the active element of the RIS 200. The RIS 200 detects the sensor alarm and changes the configuration of the Active elements to communicate with the gNB 300.

At S1060, the RIS 200 sends a request to enable beamformed backscatter mode (BBM) to the gNB 300. The request may include an identifier of the RIS 200, the type of sensor alarm, an application to which the alarm is associated and other similar information.

At S1070, the gNB 300 may determine to activate the beamformed backscatter mode based on the type of alarm and the application associated with the alarm. The gNB 300 may then send a signal informing UE 100 of beamformed backscatter mode activation. The RIS 200 may reflect the signal to the UE 100 in the passive reflection mode.

At S1080, the gNB 300 may send a signal to the RIS 200 indicating that the request to enable beamformed backscatter mode was accepted.

At S1090, the gNB 300 the RIS 200 and UE 100 may reconfigure for communication via the beamformed backscatter mode. The gNB 300 and UE 100 may reconfigure by updating a mode indicator. The RIS 200 may reconfigure by changing the configuration of the active elements of the RIS 200 to modulate messages reflected from the gNB 300 to include a backscattered signal.

At S1100, the gNB 300 may send an incoming signal to the RIS 200. The incoming signal may include information which may or may not be related to the alarm, or the application the alarm is associated with.

At S1110 the RIS 200 in the beamformed backscatter mode reflects the incoming signal with a backscattered signal modulated on the incoming signal. The backscattered signal 200 may relate to the alarm or the application associated with the alarm. The UE 100 may receive the incoming signal modulated with the backscattered signal and demodulate the signal to process the backscattered signal and the incoming signal.

Figure 2:
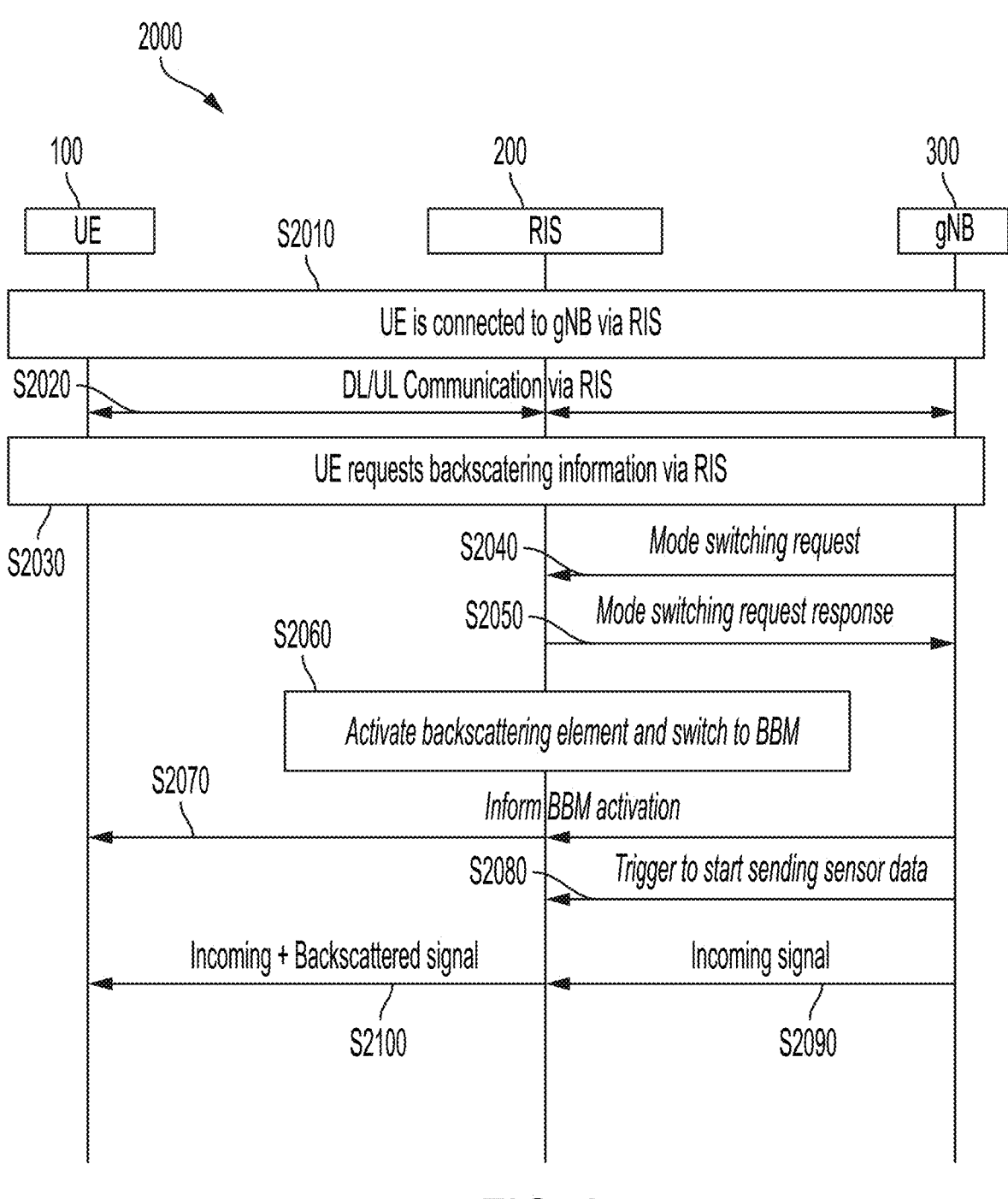
FIG. 2 illustrates another example signal diagram of communications between the UE, the RIS, and gNB, according to certain example embodiments.

FIG. 2 illustrates another example signal diagram 2000 of communications between the UE 100, the RIS 200, and gNB 300, according to certain example embodiments. Some of the operations of FIG. 2 are similar the operations of FIG. 1. Description of similar operations may be omitted or described with less detail. The operations described with regards to FIGS. 1 and 2 are not mutually exclusive and can be combined in any way to facilitate communications between the UE 100, the RIS 200, and gNB 300.

At S2010, the UE 100 may be connected to the gNB 300 via the RIS 200 in a passive reflection mode via a handshake protocol or other similar communications. At S2020, the UE 100 and gNB 300 may perform upload (UL) and download (DL) communications via the RIS 200.

At S2030, the UE 100 may determine based on an application implemented on the UE 100 to request backscattering information via RIS 200. For example, if an application requires or desires data from sensors colocated with, embedded in, or connected to the RIS 200, the UE 100 may determine to request backscattering information via the RIS 200. The UE 100 may request the backscattering information via the RIS 200. Restated, the UE may request activation of the beamformed backscatter mode so that information may be modulated via backscattering onto the signals reflected in a beamformed manner by the RIS 200. The request may include the application, desired information to be modulated onto the signal, timing, or other information needed to identify the desired communications.

At S2040, the gNB 300 may send a mode switch request to the RIS 200. The mode switch request may include the application, desired information, sensor from which the data is requested, timing, or other information needed to identify the desired communications.

At S2050, the RIS 200 may send a mode switch request response to the gNB 300 confirming the mode switch, and ability to provide the desired communications. The RIS 200 may decline the mode switch if the desired communications are not determined to be possible.

At S2060, the RIS 200 may activate backscattering elements and switch to beamformed backscatter mode. The switch may be performed by configuring the active elements of the RIS 200 for backscattering to modulate a backscattered signal on an incoming signal. In certain example embodiments, the active elements may comprise antenna elements that are connected to circuitry for modulating data on to the backscattered signal without any active radio frequency transmission chain.

At S2070, the gNB 300 may inform the UE 200 of beamformed backscatter mode activation via the RIS 200.

At S2080, the gNB 300 may communicate to the RIS 200 to start sending sensor data via the beamformed backscatter mode. The gNB 300 may include a trigger to start sending the sensor data in the communication, such as a code or a trigger message.

At S2090, the gNB 300 may send an incoming signal to the RIS 200. At S2100, the RIS 200 in the beamformed backscatter mode reflects the incoming signal with a backscattered signal modulated on the incoming signal. Accordingly, the gNB 300, RIS 200 and UE 100 may communicate in the beamformed backscatter mode with the RIS 200 modulating incoming signals with backscattered signal which conveys sensor information form a sensor of the RIS 200.

Figure 3:
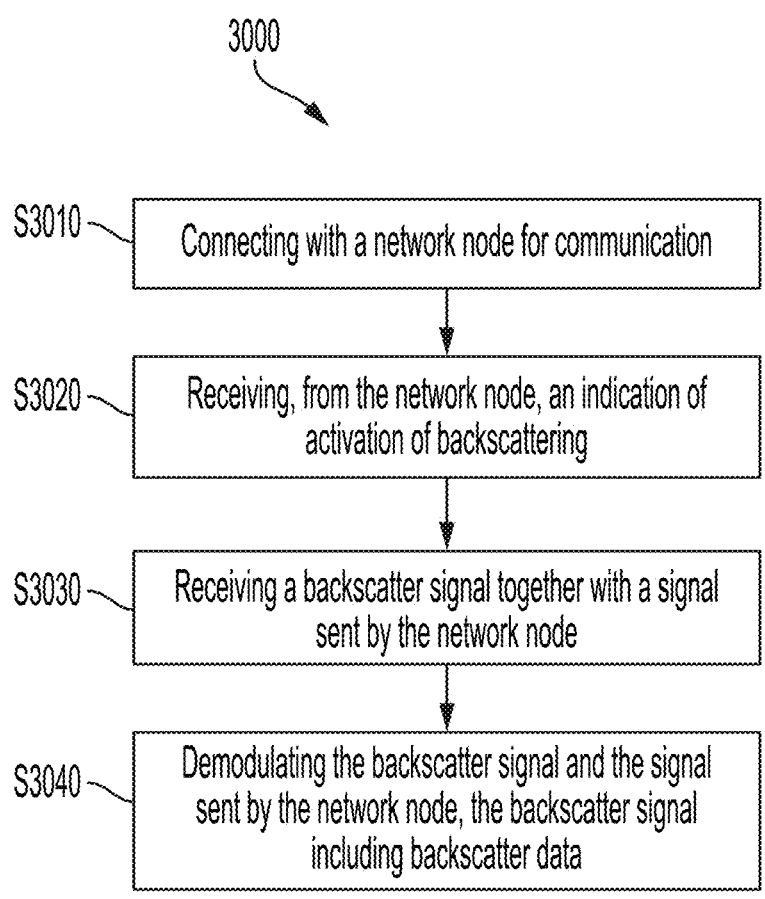
FIG. 3 illustrates an example flow chart for a method of controlling the UE, according to certain example embodiments.

FIG. 3 illustrates an example flow chart for a method 3000 of controlling the UE 100, according to certain example embodiments. In an example embodiment, the method of FIG. 3 may be performed by a network entity, or a group of multiple network elements in a 3GPP system, such as LTE or 5G-NR. For instance, in an example embodiment, the method of FIG. 3 may be performed by a user equipment (UE) such as a computer, cell phone, tablet, or the like. The UE may be similar to one of apparatuses 10 or 20 illustrated in FIG. 10.

According to certain example embodiments, the method of FIG. 3 may include, at S3010, connecting with a network node for communication, receiving, from the network node, at S3020, an indication of activation of backscattering, at S3030, receiving a backscatter signal together with a signal sent by the network node, and at S3040, demodulating the backscatter signal and the signal sent by the network node, the backscatter signal including backscatter data.

Figure 4:
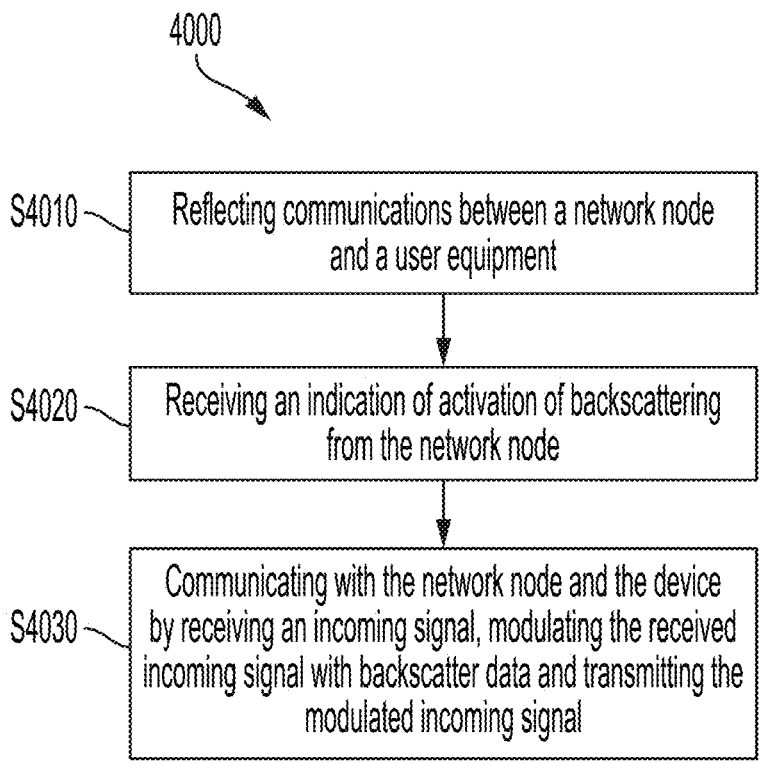
FIG. 4 illustrates an example flow chart for a method of controlling the RIS, according to certain example embodiments.
Figure 6:
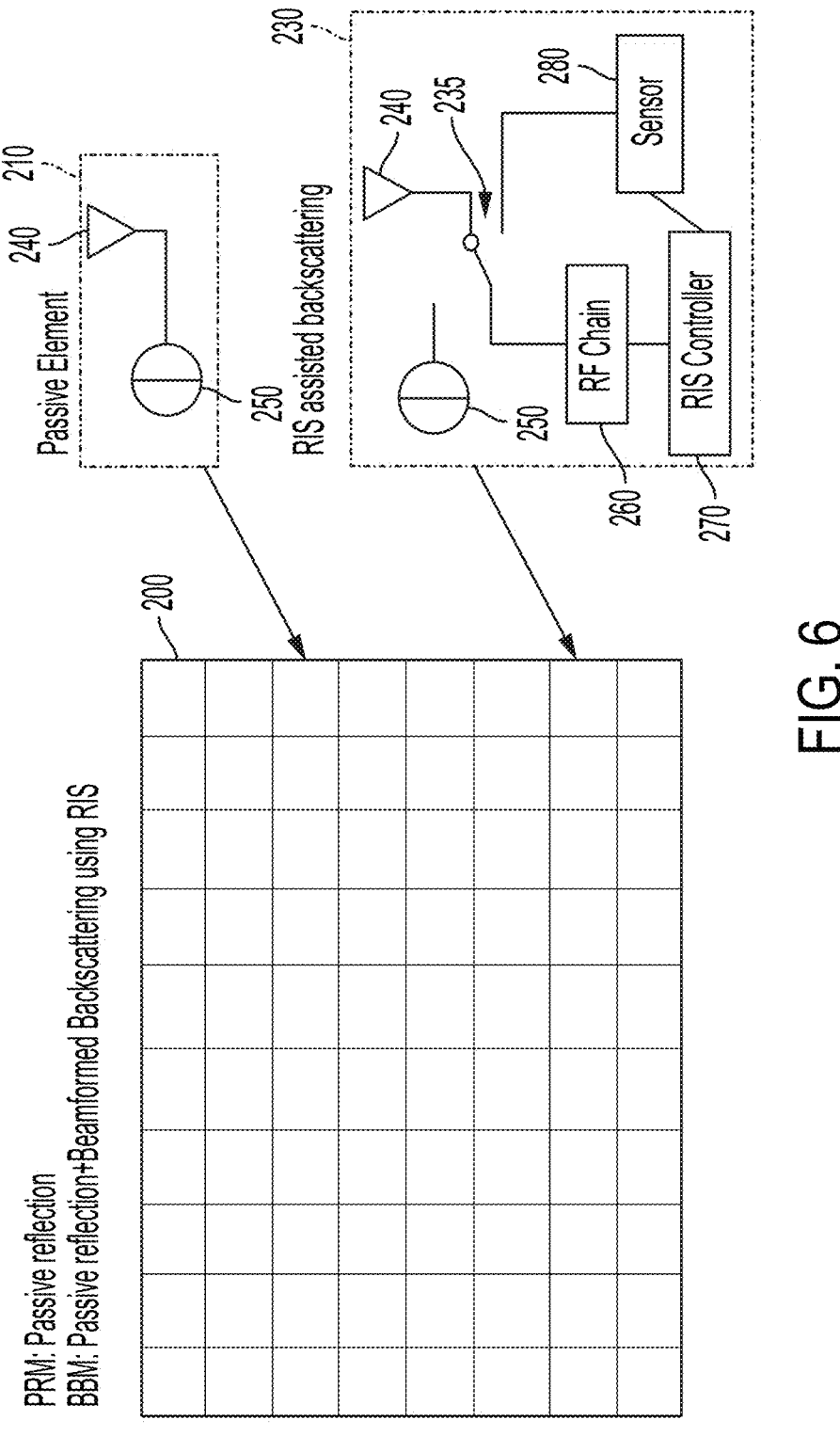
FIG. 6 illustrates an example RIS, according to certain example embodiments.

FIG. 4 illustrates an example flow diagram 4000 for a method of controlling the RIS 200, according to certain example embodiments. In an example embodiment, the method of FIG. 4 may be performed by a RIS with active and passive elements. For instance, in an example embodiment, the method of FIG. 4 may be performed by an RIS 200, as illustrated in FIG. 6.

According to certain example embodiments, the method of FIG. 4 may include, at S4010, reflecting communications between a network node and a user equipment, at S4020, receiving an indication of activation of backscattering from the network node, and at S4030, communicating with the network node and the user equipment by receiving an incoming signal, modulating the received incoming signal with backscatter data and transmitting the modulated incoming signal.

FIG. 5 illustrates an example flow chart for a method 5000 of controlling the network base station 300, according to certain example embodiments. In an example embodiment, the method of FIG. 5 may be performed by a network entity, or a group of multiple network elements in a 3GPP system, such as LTE or 5G-NR. For instance, in an example embodiment, the method of FIG. 5 may be performed by a gNB 300, or the like. The gNB 300 being similar to one of apparatuses 10 or 20 illustrated in FIG. 10.

According to certain example embodiments, the method of FIG. 5 may include, at S5010, connecting with a user equipment for communication via a reconfigurable intelligent surface (RIS), at S5020, receiving a request for a backscattering, at S5030, transmitting, by a network node, an indication of activation of the backscattering to the user equipment via the RIS, at S5040, transmitting, by the network node, an indication of activation of the backscattering to the RIS, and at S5050, communicating with the user equipment via the RIS.

FIG. 6 illustrates an example RIS 200, according to certain example embodiments. The RIS 200 may include passive elements 210 and active elements 230 in an array. The array may have a rectangular shape with N rows and M columns. The number of rows and columns may vary based on the desired signal strength and direction of the reflected signals for the RIS 200. For example, the RIS 200 may have greater strength of reflected signals with a larger array of passive elements 210 and active elements 230. The active elements may be used to steer the reflected signal (e.g., cause the greatest signal strength to occur in a desired direction). The number and the arrangement of the of active elements 230 and passive elements 210 may be determined by several factors, such as desired range of angles to reflect signals, cost (active elements 230 generally being more expensive than passive elements), and signaling/control protocols. In one example embodiment the active elements 230 may be at each corner of the array with all other elements being passive elements 210. In another example embodiment, the active elements 230 may be dispersed throughout the array. For example, the RIS 200 may be a large intelligent surface with sparse sensors (e.g., a few sensors or active elements connected to a sensor are spread throughout the array).

Each passive element 210 may include an antenna 240 and a passive phase shift element 250. The antenna 240 may receive the incoming signal and emit the reflected signal. The passive phase shift element 250 may shift a phase of the reflected signal according to a configuration of the passive phase shift element 250.

Each active element 230 may include the antenna 240 and the passive phase shift element 250. The active element 230 may also include a switch 235 for switching between an active mode and a passive mode and beamformed backscattering mode. The passive mode utilizes the passive phase shift element 250 for passive reflection with a configured phase shift. The active mode allows for active communication such as communication over a control channel with the gNB 300. The beamformed backscattering mode allows for reflecting a signal and backscattering sensor information from a sensor onto a reflected signal. The active element may include a radio frequency (RF) chain 260, a RIS controller 270 and a sensor 280. The RF chain 260 may be configured to perform backscattering to modulate an incoming signal with a backscatter signal. The RIS controller 270 may include processing circuitry (such as field programable gate array) and be configured to control the active element 230 (including controlling the switch 235, sensor 280, and RF chain 260). In the beamformed backscatter mode the sensor 280 may control inclusion of sensor information in the backscatter output, which is modulated onto the reflected input signal. In an example embodiment, the sensor 280 may sense environmental conditions such as temperature, high vibration situations (e.g., landslide or earthquake), wind speed, air quality, etc. If the environmental conditions exceed a threshold an alarm may be triggered by the RIS controller 270. The sensor 280 may be connected to a baseband of the RIS controller 270. When the RIS controller 270 determines that an alarm has been triggered, the RIS controller 270 may control the switch 235 to communicate with the gNB 300 to inform the gNB 300 of the alarm (e.g., communicate in the active mode). For example, the RIS 200 may communicate with the gNB 300 via a gNB 300 control channel.

In an example embodiment, one sensor 280 may be connected to all of the active elements 230 such that one sensor data output is modulated onto the reflected input signal by all of the active elements 230 to generate the backscatter signal. In another example embodiment, various sensors are attached to some of the active elements 230. In some example embodiments the sensor 280 may include processing circuitry to allow the sensor 280 to determine when an alarm threshold is reached and to control sensor information backscattered onto the reflected input signal.

The RIS controller 270 and RF chain 260 may be configured to perform channel sensing by measuring reference signals. The RIS controller 270 and RF chain 260 may use a compressive sensing-based solution to recover full channels between RIS, and transmitter/receiver (gNB 300/UE 100), to improve the phases of the passive elements 210. The RIS controller 270, RF chain 260, and sensor 280 may be powered by energy harvesting from radio waves. Communication in the active mode may include using harvested energy stored in a capacitor (not shown) or another form of energy storage device.

Figure 7:
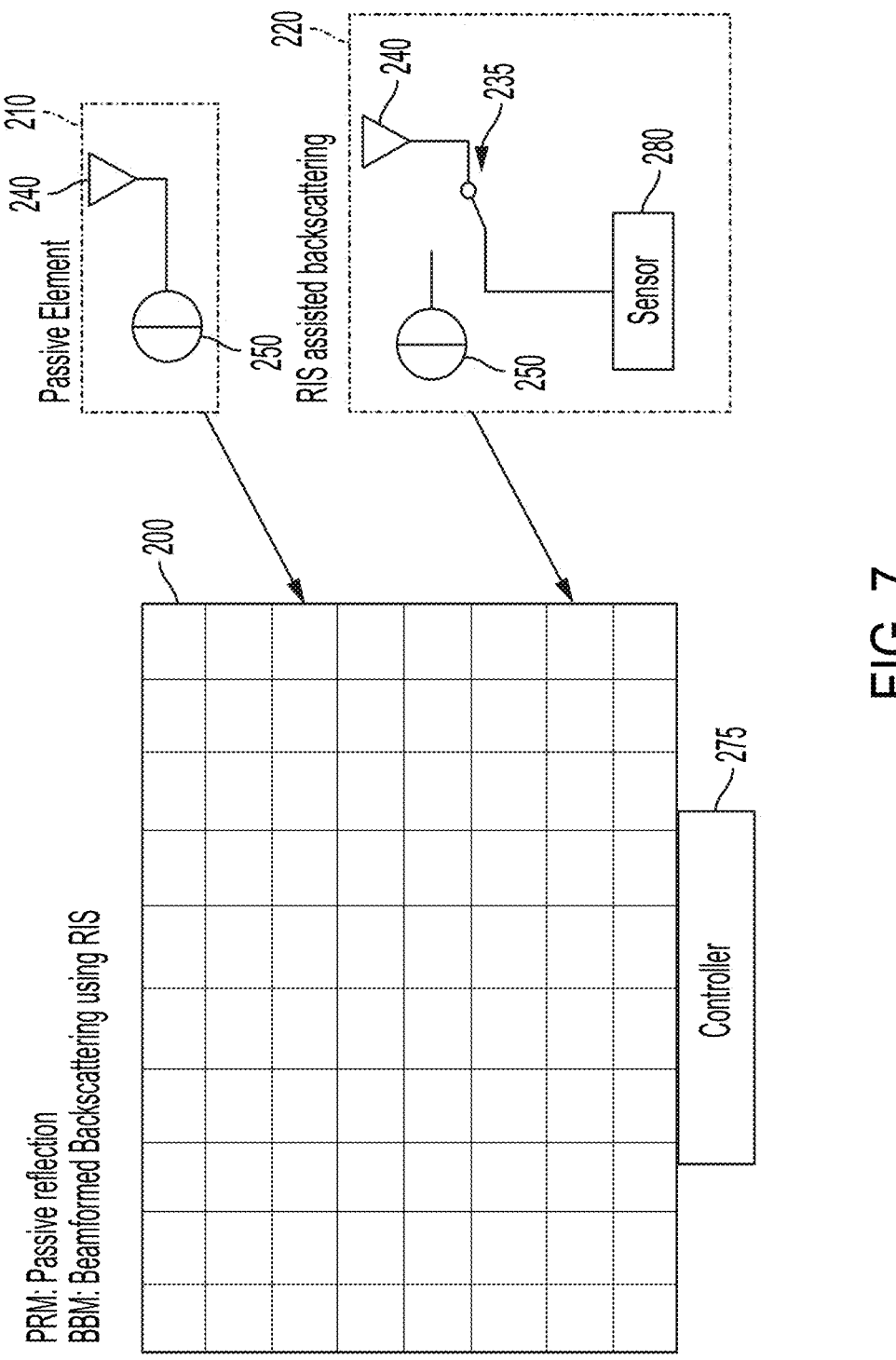
FIG. 7 illustrates another example RIS, according to certain example embodiments.

FIG. 7 illustrates another example RIS, according to certain example embodiments. The RIS may include a plurality of passive elements 210 and a plurality of passive backscatter elements 220. The passive backscatter elements may be similar to the active elements 230 in their connection to the sensor 280 and the inclusion of the switch 235, however the passive backscatter elements may not include the RF chain 270 and RIS controller 270 which allow for active communication via the active elements 230. The RIS 200 may include a controller 275 which may control the switch and sensor and other elements of the RIS. The controller 275 may include hardware allowing for active communication with the base station 300 such as a wired connection, or hardware for wireless connection. The controller 275 may be powered by a battery, a solar panel, energy harvesting from the RIS, etc. The controller 275 may include processing circuitry such as field programable gate array which allows the controller 275 to control the RIS 200.

Figure 8:
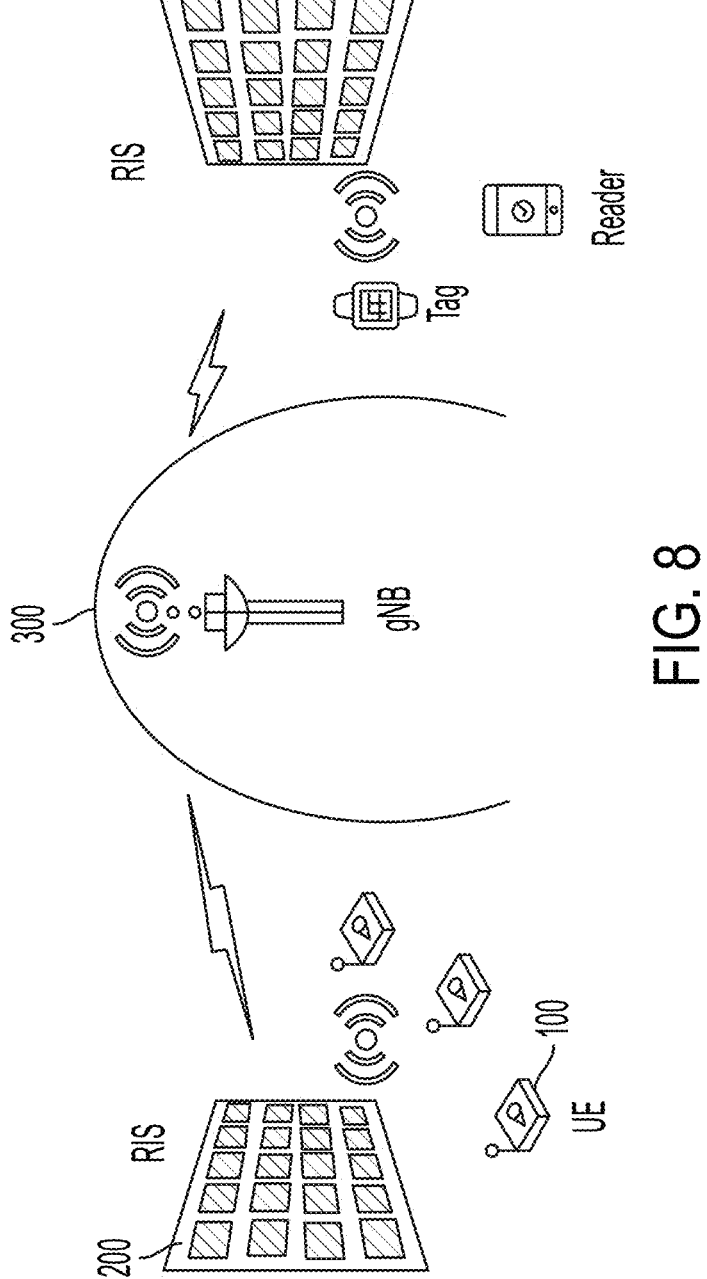
FIG. 8 illustrates an example network with the UE, RIS and gNB, according to certain example embodiments.

FIG. 8 illustrates an example network with the UE 100, RIS 200 and gNB 300, according to certain example embodiments. the gNB 300 may transmit an input signal which is received by the RIS 200. The RIS 200 may reflect only the input signal or modulate the input signal with information based on the mode of the RIS 200. The UE 100 may receive the reflected input signal with or without backscattering of additional information by the RIS.

Figure 9:
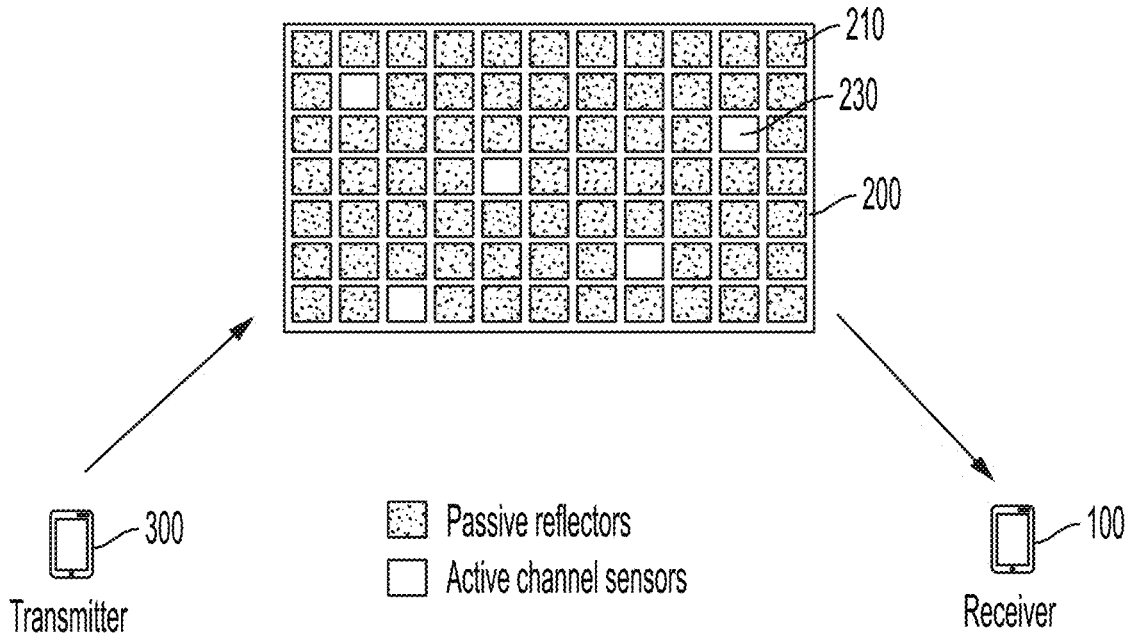
FIG. 9 illustrates another example network with the UE, RIS and gNB, according to certain example embodiments.

FIG. 9 illustrates another example network with the UE 100, RIS 200, gNB 300. The RIS 200 in this example is shown as having active elements 230 scattered throughout the array of elements. The active elements 230 may be active channel sensors configured to sense channel conditions. The RIS 200 in FIG. 9 may be an example of a large intelligent surface with sparse sensors. The RIS 200 may reflect transmission from the base station 300 to the UE 100.

Figure 10:
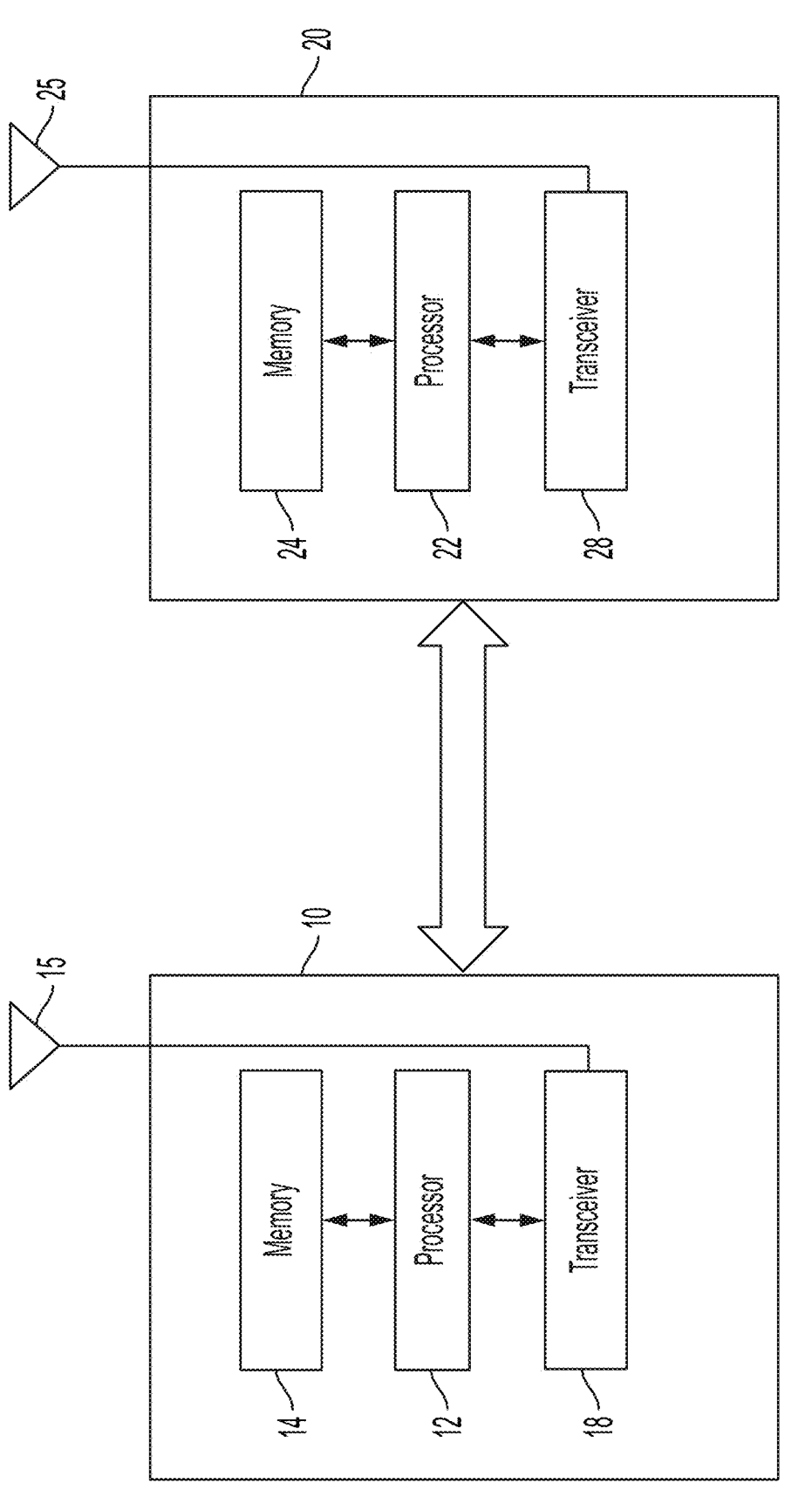
FIG. 10 illustrates a set of apparatuses, according to some example embodiments.

FIG. 10 illustrates a set of apparatuses 10 and 20 according to certain example embodiments. In certain example embodiments, apparatuses 10 and 20 may be elements in a communications network or associated with such a network. For example, apparatus 10 may be, for example, a UE, and apparatus 20 may be a network (i.e., gNB, 5GS, 5G Core, 5G RAN, etc.).

In some example embodiments, apparatuses 10 and 20 may include one or more processors, one or more computer-readable storage medium (for example, memory, storage, or the like), one or more radio access components (for example, a modem, a transceiver, or the like), and/or a user interface. In some example embodiments, apparatuses 10 and 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatuses 10 and 20 may include components or features not shown in FIG. 10.

As illustrated in the example of FIG. 10 apparatuses 10 and 20 may include or be coupled to processors 12 and 22 for processing information and executing instructions or operations. Processors 12 and 22 may be any type of general or specific purpose processor. In fact, processors 12 and 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 and 22 is shown in FIG. 10, multiple processors may be utilized according to other example embodiments. For example, it should be understood that, in certain example embodiments, apparatuses 10 and 20 may include two or more processors that may form a multiprocessor system (e.g., in this case processors 12 may represent a multiprocessor) that may support multiprocessing. According to certain example embodiments, the multiprocessor system may be tightly coupled or loosely coupled (e.g., to form a computer cluster).

Processors 12 and 22 may perform functions associated with the operation of apparatuses 10 and 20 including, as some examples, precoding of antenna gain/phase parameters, encoding and decoding of individual bits forming a communication message, formatting of information, and overall control of the apparatuses 10 and 20, including processes and examples illustrated in FIGS. 1-9.

Apparatuses 10 and 20 may further include or be coupled to a memories 14 and 24 (internal or external), which may be respectively coupled to processors 12 and 24 for storing information and instructions that may be executed by processors 12 and 24. Memories 14 and 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memories 14 and 24 can be comprised of any combination of random access memory (RAM), read only memory (ROM), static storage such as a magnetic or optical disk, hard disk drive (HDD), or any other type of non-transitory machine or computer readable media. The instructions stored in memories 14 and 24 may include program instructions or computer program code that, when executed by processors 12 and 22, enable the apparatuses 10 and 20 to perform tasks as described herein.

In certain example embodiments, apparatuses 10 and 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 12 and 22 and/or apparatuses 10 and 20 to perform any of the methods and examples illustrated in FIGS. 1-9.

In some example embodiments, apparatuses 10 and 20 may also include or be coupled to one or more antennas 15 and 25 for receiving a downlink signal and for transmitting via an UL from apparatuses 10 and 20. Apparatuses 10 and 20 may further include a transceivers 18 and 28 configured to transmit and receive information. The transceivers 18 and 28 may also include a radio interface (e.g., a modem) coupled to the antennas 15 and 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceivers 18 and 28 may be configured to modulate information on to a carrier waveform for transmission by the antennas 15 and 25 and demodulate information received via the antenna 15 and 25 for further processing by other elements of apparatuses 10 and 20. In other example embodiments, transceivers 18 and 28 may be capable of transmitting and receiving signals or data directly. Additionally or alternatively, in some example embodiments, apparatus 10 may include an input and/or output device (I/O device). In certain example embodiments, apparatuses 10 and 20 may further include a user interface, such as a graphical user interface or touchscreen.

In certain example embodiments, memories 14 and 34 store software modules that provide functionality when executed by processors 12 and 22. The modules may include, for example, an operating system that provides operating system functionality for apparatuses 10 and 20. The memory may also store one or more functional modules, such as an application or program, to provide additional functionality for apparatuses 10 and 20. The components of apparatuses 10 and 20 may be implemented in hardware, or as any suitable combination of hardware and software. According to certain example embodiments, apparatuses 10 and 20 may optionally be configured to communicate each other (in any combination) via a wireless or wired communication links 70 according to any radio access technology, such as NR.

According to certain example embodiments, processors 12 and 22 and memories 14 and 24 may be included in or may form a part of processing circuitry or control circuitry. In addition, in some example embodiments, transceivers 18 and 28 may be included in or may form a part of transceiving circuitry.

In certain example embodiments, apparatus 10 may be controlled by memory 14 and processor 12 to connect with a network node for communication, receive, from the network node, an indication of activation of backscattering, receive a backscatter signal together with a signal sent by the network node, and demodulate the backscatter signal and the signal sent by the network node, the backscatter signal including backscatter data.

In another example embodiment, the RIS 200 may be controlled to reflect communications between a network node and a user equipment, receive an indication of activation of backscattering from the network node, and communicate with the network node and the user equipment by receiving an incoming signal, modulating the received incoming signal with backscatter data and transmitting the modulated incoming signal.

In other example embodiments, apparatus 20 may be controlled by memory 24 and processor 22 to connect with a user equipment for communication via a reconfigurable intelligent surface (RIS), receive a request for a backscattering, transmit, by a network node, an indication of activation of the backscattering to the user equipment via the RIS, transmit, by the network node, an indication of activation of the backscattering to the RIS, and communicate with the user equipment via the RIS.

Certain example embodiments may be directed to an apparatus that includes means for connecting with a network node for communication, means for receiving, from the network node, an indication of activation of backscattering, means for receiving a backscatter signal together with a signal sent by the network node, and means for demodulating the backscatter signal and the signal sent by the network node, the backscatter signal including backscatter data.

In an embodiment the indication of activation of backscattering may comprise a configuration comprising at least one of a start time, a modulation, a coding, and a size of data block.

In an embodiment the apparatus may further include, means for sending a request for a backscattering based on an application, wherein the indication of activation of backscattering comprises a configuration based on the application.

In an embodiment the apparatus may further include, communicating, by a user equipment to the network node, a capability of the user equipment to receive backscatter signals.

Other example embodiments may be directed to an apparatus that includes means for reflecting communications between a network node and a user equipment, means for receiving an indication of activation of backscattering from the network node, and means for communicating with the network node and the device user equipment by receiving an incoming signal, modulating the received incoming signal with backscatter data and transmitting the modulated incoming signal.

In an embodiment the apparatus may further include means for generating, by a reconfigurable intelligent surface (RIS), the backscatter data based on sensing by a sensor of the RIS.

In an embodiment the indication of activation of backscattering comprises a configuration comprising at least one of start time, modulation, coding, and size of data block.

In an embodiment the apparatus may further include means for transmitting, to the network node, a request for the backscattering based on a trigger, wherein the indication of activation of backscattering comprises a configuration based on an application.

In an embodiment the apparatus may further include means for reconfiguring elements in a reconfigurable intelligent surface (RIS) for communicating using the backscattering.

Other example embodiments may be directed to an apparatus that includes means for connecting with a user equipment for communication via a reconfigurable intelligent surface (RIS), means for receiving a request for a backscattering, means for transmitting, by a network node, an indication of activation of the backscattering to the user equipment via the RIS, means for transmitting, by the network node, an indication of activation of the backscattering to the RIS, and means for communicating with the user equipment via the RIS.

In an embodiment the apparatus may further include means for determining to activate the backscattering based on an application or an indication of a trigger included in the request for the backscattering.

In an embodiment the apparatus may further include means for receiving an indication of capability of the user equipment to receive backscatter signals, wherein the determining to activate the backscattering is further based on the received indication of capability of the user equipment to receive backscatter signals.

In an embodiment the indication of activation of the backscattering comprises a configuration comprising at least one of start time, modulation, coding, and size of data block.

Certain example embodiments described herein provide several technical improvements, enhancements, and/or advantages. In some example embodiments, it may be possible for a RIS to detect environmental conditions which trigger an alarm and communicate the alarm to devices communicating via the RIS.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

AIoT Ambient internet of things
BBM Beamformed backscatter mode
PRM Passive reflection mode
RIS Reconfigurable Intelligent Surface
UE User Equipment

We claim:

1. A first apparatus, comprising:
at least one processor; and
at least one memory storing instructions that, when executed by the at least one processor, cause the first apparatus at least to:
communicate, via a second apparatus, with a network node;
receive, via the second apparatus, an indication of activation of backscattering from the network node;
receive, from the second apparatus, a backscatter signal together with a reflected signal, wherein the reflected signal comprises a reflection, by the second apparatus, of a signal sent by the network node; and
demodulate the backscatter signal and the reflected signal,
wherein the backscatter signal includes backscatter data.

2. The first apparatus of claim 1, wherein the indication of activation of backscattering comprises a configuration comprising at least one of a start time, a modulation, a coding, or a size of data block.

3. The first apparatus of claim 1, wherein the instructions, when executed by the at least one processor, further cause the first apparatus at least to:
send a request for a backscattering based on an application,
wherein the indication of activation of backscattering comprises a configuration based on the application.

4. The first apparatus of claim 1, wherein the instructions, when executed by the at least one processor, further cause the first apparatus at least to:
communicate, to the network node, a capability of the first apparatus to receive backscatter signals.

5. The first apparatus of claim 1, wherein the second apparatus comprises of is comprised in a reconfigurable intelligent surface; and
the indication of activation of backscattering is received via a reflection of the reconfigurable intelligent surface.

6. The first apparatus of claim 1, wherein the second apparatus comprises or is comprised in a reconfigurable intelligent surface; and
the backscatter signal is received from a reflection of the reconfigurable intelligent surface.

7. The first apparatus of claim 1, wherein the received indication of activation comprises a downlink signal sent by the network node.

8. The first apparatus of claim 1, wherein the first apparatus comprises or is comprised in a user equipment.

9. An apparatus, comprising:
at least one processor; and
at least one memory storing instructions that, when executed by the at least one processor, cause the apparatus at least to:
in a passive reflection mode of the apparatus, reflect communications between a network node and a user equipment;
receive an indication of activation of a beamformed backscattering mode of the apparatus from the network node; and
in the beamformed backscattering mode of the apparatus, communicate with the network node and the user equipment by receiving an incoming signal, modulating the received incoming signal with backscatter data, and transmitting the modulated incoming signal.

10. The apparatus of claim 9, wherein the instructions, when executed by the at least one processor, further cause the apparatus at least to:

generate the backscatter data based on sensing by a sensor of the apparatus.

11. The apparatus of claim 9, wherein the indication of activation of the beamformed backscattering mode comprises a configuration comprising at least one of start time, modulation, coding, and size of data block.

12. The apparatus of claim 9, wherein the instructions, when executed by the at least one processor, further cause the apparatus at least to:

transmit, to the network node, a request for the backscattering based on a trigger.

13. The apparatus of claim 9, wherein the indication of activation of the beamforming backscattering mode comprises a configuration based on an application.

14. The apparatus of claim 9, wherein the instructions, when executed by the at least one processor, further cause the apparatus at least to:

reconfigure elements in the apparatus for communicating using the backscattering.

15. The apparatus of claim 9, wherein the apparatus comprises or is comprised in a reconfigurable intelligent surface.

16. An apparatus, comprising:

at least one processor; and at least one memory storing instructions that, when executed by the at least one processor, cause the apparatus at least to:

communicate, via a reconfigurable intelligent surface, with a user equipment;

receive a request for a backscattering from the reconfigurable intelligent surface; and transmit, via the reconfigurable intelligent surface, an indication to the user equipment of activation of a beamformed backscattering mode of the reconfigurable intelligent surface.

17. The apparatus of claim 16, wherein the instructions, when executed by the at least one processor, further cause the apparatus at least to:

determine to activate the beamformed backscattering mode based on an application or an indication of a trigger included in the request for the backscattering; and transmit an indication of activation of the beamformed backscattering mode to the reconfigurable intelligent surface.

18. The apparatus of claim 17, wherein the instructions, when executed by the at least one processor, further cause the apparatus at least to:

receive an indication of capability of the user equipment to receive backscatter signals, and wherein the determining to activate the backscattering is further based on the received indication of capability of the user equipment to receive backscatter signals.

19. The apparatus of claim 17, wherein the indication of activation of the beamformed backscattering mode comprises a configuration comprising at least one of start time, modulation, coding, and size of data block.

20. The apparatus of claim 16, wherein the apparatus comprises or is comprised in a network node.

* * * * *